US012786346B2

(12) United States Patent
Schröer et al.

(10) Patent No.: US 12,786,346 B2
(45) Date of Patent: Nov. 3, 2026

(54) METHOD FOR MULTISPECTRAL RECORDING OF AN IMAGE STREAM AND ASSOCIATED IMAGE RECORDING SYSTEM

(71) Applicant: Schölly Fiberoptic GmbH, Denzlingen (DE)

(72) Inventors: Stefan Schröer, Freiburg (DE); Daniel Härter, Emmendingen (DE); Hannes Joseph, Bahlingen (DE); Johannes Bourbon, Freiburg (DE); Matthias Kühn, Elzach (DE)

(73) Assignee: SCHOELLY FIBEROPTIC GMBH, Denzlingen (DE)

( * ) Notice: Subject to any disclaimer, the term of this patent is extended or adjusted under 35 U.S.C. 154(b) by 253 days.

(21) Appl. No.: 18/583,958

(22) Filed: Feb. 22, 2024

(65) Prior Publication Data

US 2024/0291942 A1 Aug. 29, 2024

(30) Foreign Application Priority Data

Feb. 23, 2023 (DE) ......................... 102023104491.5

(51) Int. Cl.
*H04N 5/77* (2006.01)
*H04N 5/775* (2006.01)
(Continued)

(52) U.S. Cl.
CPC ............... *H04N 5/77* (2013.01); *H04N 5/775* (2013.01); *H04N 23/12* (2023.01); *H04N 23/56* (2023.01); *H04N 23/66* (2023.01)

(58) Field of Classification Search
CPC .......... H04N 5/77; H04N 5/775; H04N 23/12; H04N 23/56; H04N 23/66; H04N 23/10; H04N 23/60; A61B 1/045; A61B 1/05
(Continued)

(56) References Cited

U.S. PATENT DOCUMENTS 8,992,418 B2 * 3/2015 Kennedy .............. A61B 1/0004 600/110
9,423,822 B1 * 8/2016 Singh ......................... G06F 1/12
(Continued)

FOREIGN PATENT DOCUMENTS

DE 102019132045 * 5/2020 ........... H04N 23/555
DE 102019132045 A1 5/2020

*Primary Examiner* — Lin Ye
*Assistant Examiner* — Chan T Nguyen
(74) *Attorney, Agent, or Firm* — Volpe Koenig

(57) ABSTRACT

For high-performance "advanced imaging" applications, a synchronization signal (13), which is output by a playback device (14) or another data sink, such as a server application, is used to synchronize the chronological recording of an image stream (1) chronologically exactly with the playback of this image stream on the playback device and/or to synchronize the recording with an alternating illumination. Here, the synchronization signal (13) is used to trigger an image recording frequency of an image sensor (7) of an image recording system (23), by which the image stream is recorded. Furthermore, the synchronization signal can also be used to chronologically trigger a light source (21) of the image recording system, so that during the recording of the sequence of single images (2), an alternating illumination is obtainable, which is also synchronized with the recording of the single images and/or the image playback on the playback device.

20 Claims, 4 Drawing Sheets

(51) Int. Cl.

| | |
|---|---|
| ***H04N 23/12*** | (2023.01) |
| ***H04N 23/56*** | (2023.01) |
| ***H04N 23/66*** | (2023.01) |

(58) Field of Classification Search

USPC .................................................... 348/211.4

See application file for complete search history.

(56) References Cited

U.S. PATENT DOCUMENTS

| | | | | |
|---|---|---|---|---|
| 2018/0003822 | A1* | 1/2018 | Li | G01S 17/08 |
| 2019/0199890 | A1* | 6/2019 | Saito | H04N 23/90 |
| 2019/0342481 | A1* | 11/2019 | Sorgius | G03B 15/05 |
| 2020/0118293 | A1* | 4/2020 | Saito | G01B 11/002 |
| 2024/0249490 | A1* | 7/2024 | Hashimoto | G06V 10/44 |

* cited by examiner

METHOD FOR MULTISPECTRAL RECORDING OF AN IMAGE STREAM AND ASSOCIATED IMAGE RECORDING SYSTEM

CROSS-REFERENCE TO RELATED APPLICATIONS

This application claims priority to German Patent Application No. 10 2023 104 491.5, filed Feb. 23, 2023, which is incorporated herein by reference as if fully set forth.

TECHNICAL FIELD

The invention relates to a method for multispectral recording of an image stream. In this method, a sequence of single images (=sequence of so-called "frames") of a scene (for example a specific surgery situation), in particular in the form of a continuous video image data stream, is recorded as an image stream using an image sensor of an image recording system. At least two different types of single images are recorded here in different associated wavelength ranges (and at different points in time) using the image sensor. For example, the different single images can alternate in the sequence. In such methods, the single images are thus chronologically separated from one another.

The invention furthermore relates to an associated image recording system, which can be designed, for example, as an endoscope, as an exoscope, or as a microscope and which can be configured so that the image recording system carries out the method independently. The image recording system has (at least) one image sensor, which is configured to record at least two different types of single images (as described above) in different associated wavelength ranges (and at different points in time) in the form of a continuous image stream. "Recording" can be understood here in particular as the sensory acquisition of the entire respective spectrum with the aid of the image sensor. If the image recording system has multiple such image sensors, each of these image sensors can accordingly be configured to record at least two different types of single images in different associated wavelength ranges.

BACKGROUND

Comparable methods and systems have previously been disclosed. Previous approaches have often been directed in this case, however, to spatially separating the different spectra to be sensorially acquired, for example, with the aid of beam splitters and wavelength-selective mirror surfaces, which are typically designed as dichroic beam splitters. However, this enormously increases the technical expenditure to produce such an image recording system. Moreover, in particular in chip-in-tip endoscopes, the installation space generally only permits the use of two CMOS image sensors. The number of spectrally different single images is thus limited from the outset. Furthermore, these systems typically have very precisely defined spectral ranges which may only be changed by exchanging a mirror layer or a beam splitter which performs spectral splitting of the imaging beam path.

A novel field of application of methods and systems as described at the outset is so-called "advanced imaging". This can be understood as the approach of using commercial CMOS image sensors (in future possibly having 4K resolution and a frame rate of 60 Hz), which generally only offer typical white light imaging, to provide additional optional functionality for the user, for example by recording additional spectra. It is presently already possible to optically acquire the oxygen saturation in human tissue (i.e., by offsetting different spectral ranges according to specific offsetting rules) and thus detect tumors in the body of a patient early using an endoscope with application of "advanced imaging". Furthermore, it is also possible to differentiate different types of tissue on the basis of a spectral fingerprint, wherein typically multiple spectrally different single images also have to be recorded for this purpose. A further application of "advanced imaging" is recording fluorescence images using a CMOS image sensor and superimposing each of these fluorescence images with a white light image acquired using the same CMOS image sensor.

In such approaches, an alternating illumination, which thus changes over time, is also often used.

SUMMARY

Proceeding therefrom, the object of the present invention is that of opening up new technical options for high performance "advanced imaging" applications.

To achieve this object, one or more of the features disclosed herein are provided according to the invention in a method for multispectral imaging. In particular, it is therefore proposed according to the invention to achieve the object in a method of the type mentioned at the outset that the recording of the sequence of single images using the image sensor is triggered with the aid of an external synchronization signal.

Such an external synchronization signal can in particular be output by a playback device, wherein in this case the image stream can be played back by the playback device, thus in particular on a monitor, by virtual-reality glasses, or by an optical projector.

In particular if the image data stream is transferred from the image recording system to a data sink, thus in particular to a server system or to a database or to another computer system, this data sink can thus also provide the external synchronization signal. The playback device can thus also be understood as a data sink, because it also receives the image data stream from the image recording system (for example, in the form of a corresponding image signal). As will be explained in more detail below, the external synchronization signal can also trigger an alternating illumination used in the method. Therefore, it can also be provided in the method that said alternating illumination is (chronologically) triggered by a server system or another data sink with the aid of said synchronization signal. In such a case, the data sink thus functions as a clock for the alternating illumination and the recording of the image data.

An image recording system according to the invention can also have multiple image sensors as mentioned. A respective imaging beam path, in particular originating from a common imaging optical unit, can also be guided in this case onto the respective image sensor by using beam splitters, as is previously known per se.

"Triggering" can be understood here in particular to mean that a respective beginning and/or a respective end of the respective chronological recording section which is provided for one of the single images is specified by the synchronization signal.

Additionally thereto, the synchronization signal can also be transmitted to at least one light source of the image recording system in order to chronologically trigger and/or modulate a light emission of this light source, as will be explained in more detail.

If novel fluorescent pigments are used or in case of a desired change of the spectral range to be acquired for instance, an already existing image recording system according to the invention does not necessarily require adaptation. It is often sufficient solely to change an excitation or illumination wavelength used in order to implement the desired adaptation.

In contrast, it has been typical up to this point in the prior art that a camera control unit, upon transmission of video image data to the playback device, specifies a rate of the image playback to the playback device. The invention now inverts this concept.

The invention accordingly proposes that an image signal transmission chain, which is used to generate and visualize the image stream, runs originating from the playback device as the clock to the image sensor and from there back to the playback device. This is because the image sensor has to transmit image data to the playback device for the playback of the image stream on the playback device. The image signal transmission chain therefore forms a loop because it starts at the playback device and also ends there.

The synchronization signal can thus be generated and/or at least provided by the playback device. In this case, the synchronization signal is preferably synchronized with the playback of the image stream on the playback device. In other words, the synchronization signal can specify at which rate and/or at which point in time the single images of the image stream are displayed on the playback device, i.e. are played back by the playback device.

The approach according to the invention is advantageous above all in that latency times during the recording and playback of the single images can be kept as short as possible. Valuable time within a time interval (=time span) available for recording one of the single images can thus be obtained, which can then be utilized, for example, for complex electronic signal preparation and/or electronic image generation (in the sense of "advanced imaging", thus in particular with processing of at least two different types of single images which can spectrally differ, for example). This is because with high latency times, the period of time available for such calculations within said time interval fuses, which then makes it necessary that the calculation has to be completed in an extremely short time. However, this is often only possible with compromises (less complex calculation and/or higher performance and thus more expensive hardware).

The invention can thus reduce the requirements on hardware which is used for such calculations or the invention can even enable complex calculations for the first time because more time is available within the time intervals for such complex calculations/digital signal processing. For example, up to this point latency times in the range of approximately 16 ms at the monitor have often occurred. This is critical especially in advanced imaging applications, because typically complex processing of the single images has to take place therein and only the time of an entire frame (=recording section of a single image) is available for this purpose. However, if the latency time rises, the time which is still available for such processing sinks.

Furthermore, it is advantageous that often an electronic intermediate buffer, as has often been used up to this point when a synchronization signal is transmitted from a camera control unit (CCU) to a monitor, can be omitted. It can thus be provided in the method that the synchronization signal is transmitted in real time, in particular without using an electronic intermediate buffer, from the playback device to the image sensor and/or to a light source of the image recording system. However, depending on the design of the image signal chain, real-time processing can also be implemented upon use of an electronic intermediate buffer in an image recording system according to the invention.

The image sensor used in the method can as mentioned be a single, in particular only image sensor of an image recording system (for example medical), as will be described in more detail as part of the invention. However, it can also be one of multiple image sensors used in the image recording system. Especially in the first case, the invention opens up new options for high-performance multispectral imaging for 1-CMOS image sensor image recording systems, as are used, for example, in low-cost endoscopes. However, also in stereoscopic systems which use two image sensors to enable three-dimensional vision using the system or upon the expansion of already existing image recording systems, which can also have a beam splitter, the invention can be used to acquire new spectral ranges and always achieve optimum synchronization at the same time.

In order to trigger the recording of the image stream (this takes place with the aid of the image sensor of the image recording system), the synchronization signal can be transmitted in a wired or at least partially wireless manner to the image recording system. In the reverse direction, the image stream can also be transmitted in a wired or (at least partially) wireless manner from the image sensor/from the image recording system to the playback device.

A single image can be understood here in particular as a single image ("frame") of a video image data stream (thus a film sequence).

The image stream recording method can be used particularly advantageously in a medical image recording system, which is in particular endoscopic. In this case, the sequence of single images can be recorded in particular using a single image sensor, preferably a CMOS image sensor, of the image recording system, preferably as a continuous video image data stream. The image sensor can be arranged in this case, for example, in the tip of the endoscope ("chip-in-tip") or, for example, in a separate camera head.

Different spectra are to be selectively acquired using the image sensor according to the invention in that these spectra are no longer separated spatially, but rather chronologically. In comparison to previously known approaches, significant technical expenditure is thus avoided since only a single image sensor is used, so that advanced imaging applications can be made available cost-effectively.

The concept according to the invention can be applied in numerous advantageous embodiments which are described below and in the claims:

As already mentioned, it can be provided that during the recording of the single images, the scene is illuminated using a chronologically alternating illumination. The at least two different types of single images can thus spectrally differ from one another.

It is to be noted at this point that the invention thus proposes recording at least one type A single image and at least one type B single image using the same image sensor, with chronologically changing/alternating illumination. It goes without saying that this concept is also transferable to three or even four different types of single images which each spectrally differ and are recorded using the same image sensor, with changing illumination and in chronological succession. "Spectrally differing" can be understood here in particular to mean that the respective single images were recorded by means of spectrally different light. The single images accordingly reproduce different spectra.

According to one embodiment, it is provided that at least one type A single image of the sequence is recorded during a chronological type A recording segment. This can take place in particular while the scene is illuminated using or by a first illumination light, which is in a first wavelength range. Furthermore, it is provided that at least one type B single image of the sequence is recorded during a chronological type B recording segment. This can take place in particular while the scene is illuminated using a second illumination light, which is in a second wavelength range differing from the first wavelength range. It is to be emphasized once again that in this case the at least one type A and the at least one type B single image are recorded using the same image sensor.

The first and second wavelength range can display a spectral overlap; however, they are not identical and are therefore selected differently to thus be able to record spectrally differing types of single images using the image sensor.

The first illumination light can be ambient light, for example; or an external illumination light or an illumination light which is emitted by a light source of the mentioned image recording system. The second illumination light can be, for example, an excitation light or a spectrally narrow-band light.

The type A recording segment is the period of the time span or time spans within a time interval which is actually used for recording the type A single image. Similarly, the type B recording segment is the period of the time span or the time spans within a time interval which is used for recording the type B single image. The respective periods of time which are provided/used for the two recording segments can differ.

It can also be provided that a chronological modulation of the alternating illumination, thus in particular a chronological modulation of the first illumination light and/or a chronological modulation of the second illumination light, is triggered with the aid of the synchronization signal output by the playback device. For this purpose, for example, a camera control unit of the image recording system can receive the synchronization signal from the playback device and transfer it to a light source in order to thus trigger the chronological modulation of an illumination used in the method. Such a modulation can take place both in digital and in analog form: analog can be understood in particular in this case to mean that a continuous differentiable signal, such as a sinusoidal signal profile, is used as the trigger signal; digital can be understood in particular, in contrast, to mean that a continuous or discontinuous non-differentiable signal, such as a square-wave signal profile, is used as a trigger signal.

One embodiment of the method provides that the scene is permanently illuminated using an excitation light and furthermore alternately using white light, wherein the modulation of the white light is controlled on the basis of the external synchronization signal. Of course, embodiments are also possible in which the scene is permanently illuminated using white light and furthermore alternately using an excitation light, wherein then the modulation of the excitation light is controlled on the basis of the external synchronization signal. Fluorescence images can be obtained by such embodiments if the white light is currently switched off. During the white light illumination, fluorescent light is also recorded, so that a spectral mixed image is recorded. The image signal component of the fluorescent light can be removed later from the recorded white light images (mixed images) by signal processing, however, for example by means of a subtractive spectrum reconstruction, which uses the information from the fluorescence images to determine the image signal component of the fluorescence. The reverse case is also conceivable here and can be carried out using the method: in this case the white light is permanently activated/switched on and the excitation light is switched on in addition sequentially, i.e. chronologically modulated.

Another variant of the method proposes that in at least one chronological overlap segment, the scene is simultaneously irradiated using the first illumination light and the second illumination light. This may be implemented, for example, so that the scene is irradiated using excitation light and using white light during the overlap segment. Such a procedure can be useful to extend the length of the chronological recording segments, namely because a change of the illumination of the scene can be performed in the overlap segment (for example, white light intensity rises or falls).

This overlap segment can be, for example, a recording-free time segment, in which no image data are acquired using the image sensor, but in which the illumination changes. Accordingly, one embodiment provides that the overlap segment is in a waiting interval between two directly successive single images of the sequence, in which no single image is recorded. The waiting interval therefore represents a recording gap here, in which light is possibly incident on the image sensor, but it does not record a single image. This approach therefore results in a discontinuous recording of the images.

Alternatively thereto, it can also be provided that during at least one partial segment of the chronological type A recording segment of the at least one type A single image, the scene is also irradiated using the second illumination light and/or that during at least one partial segment of the chronological type B recording segment of the at least one type B single image, the scene is also irradiated using the first illumination light. In such a case, the respective obtained image can nonetheless be substantially spectrally pure, however. This is true in particular if the resulting partial segment is very short, for example, at the beginning or at the end of the respective recording segment and is used to change the illumination (at the beginning and/or at the end of the recording segment).

In one embodiment, the chronological overlap segment can correspond with a chronological recording segment, in contrast, within which one of the single images is recorded. For example, if the scene is illuminated using excitation light and white light in the overlap segment, white light can be recorded in this segment, which additionally contains a fluorescent light component (=mixed image).

Still another embodiment of the method proposes that during the entire chronological recording of the respective type A single image, the scene is only irradiated using the first illumination light, but not using the second illumination light and/or that during the entire chronological recording of the respective type B single image, the scene is only irradiated using the second illumination light but not using the first illumination light. In these cases, spectrally "pure" type A or type B single images are thus recorded, but not spectrally mixed images.

Furthermore, it can be provided in the method, for example, that an intensity of the first illumination light before the overlap segment is greater than in and/or after the overlap segment and/or that an intensity of the second illumination light after the overlap segment is greater than in and/or before the overlap segment. This can result, for example, in a falling flank of the intensity of the first illumination light or a rising flank of the intensity of the second illumination light, each during the overlap segment. In other words, it can thus be provided that the intensities of the first illumination light and the second illumination light in the overlap segment have time derivatives having different signs (falling flank meets rising flank). It can accordingly be provided that an intensity of the first illumination light drops in the overlap segment, while an intensity of the second illumination light rises in the overlap segment (and vice versa).

One embodiment of the method provides that the image stream is played back on or by the playback device at an image playback frequency which is chronologically synchronized with a modulation frequency of the alternating illumination, in particular with a respective modulation frequency of the first illumination light and/or the second illumination light and/or with an image recording frequency at which the image sensor records the single images. The image playback frequency, thus the frequency with which the images appear on the playback device, does not necessarily have to be constant, however; rather, it can also vary over time depending on the design of the method.

Finally, it can also be provided in the method that between two directly successive chronological illumination segments of the first illumination light and/or the second illumination light, a (respective) illumination-free pause segment is configured, which is achieved by correspondingly switching off the associated light source. Illumination-free can be understood here, for example, to mean that the first and/or the second illumination light is/are entirely absent during the pause segment. "Illumination-free pause segment" can also be understood, depending on the design of the image recording system, however, to mean that the first and/or the second illumination light is only reduced enough in the intensity that it is no longer detectable in a location-resolved manner using the image sensor (i.e., that the respective illumination light at most generates weak noise but no longer an image on the image sensor). If only one of the two light sources is entirely or partially switched off, for example, it is possible to change back and forth between a polychromatic and monochromatic illumination.

It can also be provided in this case that the pause segment (chronologically) overlaps with at least one recording segment of one of the single images. In particular this single image is then completely free of the illumination wavelengths which have just been switched off.

It can also be provided that at least two directly successive illumination-free pause segments have different chronological lengths. The image recording rate can be optimized by such a design, because depending on the available speed of the modulation of the respective light source, the associated pause segment can accordingly be selected to be short. Excessively long pause segments are thus avoided, which is favorable to ensure a high image recording rate of the different image types, which all have to be recorded using the same image sensor.

According to the invention, the features of the independent device claim, which is directed to an image recording system, are provided to achieve the mentioned object. In particular, it is therefore proposed according to the invention to achieve the object in an image recording system of the type described at the outset that a rate of the image sensor during the recording of the single images is specifiable (namely in particular with the aid of an external synchronization signal as described above), wherein the image sensor is configured to adapt this rate on the basis of an external synchronization signal; this can be carried out in particular by changing an image recording frequency (of the image sensor) and/or by changing a respective starting point of the chronological recording segment associated with a single image. Depending on the design, the image recording frequency of the image sensor can remain constant here; however, the rate of the image sensor is then chronologically synchronized with the playback unit (by adapting the starting points of the chronological recording segments) and the latency time is thus reduced.

Furthermore, it is provided that the image recording system is configured, in particular by means of a signal input port or by means of an interface, to receive the external synchronization signal. As already mentioned above, the external synchronization signal can originate from a playback device used to play back the recorded image stream or from another data sink, to which the image recording system is to transmit the image stream. The playback device/the data sink can therefore function as a clock and specify said rate of the image sensor during the recording of the single images by means of the synchronization signal.

It is particularly favorable in this case if this image recording system is configured to implement a method according to the invention as described above or claimed here. "Recording" can be understood here in particular as the sensory acquisition of the entire respective spectrum with the aid of the image sensor.

As previously mentioned, the external synchronization signal can be provided by a playback device, on which/by which the image stream is played back, in particular as a video image data stream.

An alternative possibility, for example, is to use a synchronization signal which is generated and provided by a light source of the image recording system. In this case, the light source functions as the clock of the image signal transmission chain, which then runs originating from the light source to the image sensor and from there to the playback device.

The image recording system can furthermore be configured to transmit the at least two different types of single images in real time to the playback device. The different types of single images can thus be played back by the playback device in real time as a live video image data stream.

In this case, artificial images can also be generated by the image recording system, thus, for example, a superposition of two different types of single images (for example a white light image with superimposed fluorescent image). The image recording system can thus be configured to calculate synthetic images from the at least two different types of single images (in the sense of "advanced imaging") in particular and to transmit them in real time as an image stream of synthetic single images to the playback device. It can be advisable here to use a transmission cable, by means of which the synchronization signal is also transmitted, for transmitting the single images.

The image can moreover also comprise at least one light source, which emits a first illumination light and/or a second illumination light (in particular as was described above, i.e. spectrally different illumination lights). A controller of the image recording system can be configured here to activate the at least one light source on the basis of the received external synchronization signal in order to modulate its intensity, preferably electronically. Mechanical shutters or external filter wheels and the like can thus be omitted, due to which the image recording system can be designed, for example, as a compact endoscope having an integrated illumination light source that can be electronically modulated.

The image recording system can also comprise a camera control unit (CCU), which is configured to receive the external synchronization signal and to transmit it to the image sensor, in order to thus trigger the recording of the single images, and/or to transmit it to a light source of the image recording system in order to trigger a chronological modulation of the light source.

BRIEF DESCRIPTION OF THE DRAWINGS

The invention will now be described in more detail on the basis of exemplary embodiments but is not restricted to these exemplary embodiments. Further embodiments of the invention can be obtained from the following description of a preferred exemplary embodiment in conjunction with the general description, the claims, and the drawings.

In the following description of various preferred embodiments of the invention, elements corresponding in their function receive corresponding reference signs even with differing design or shaping.

In the figures:

Figure 1:
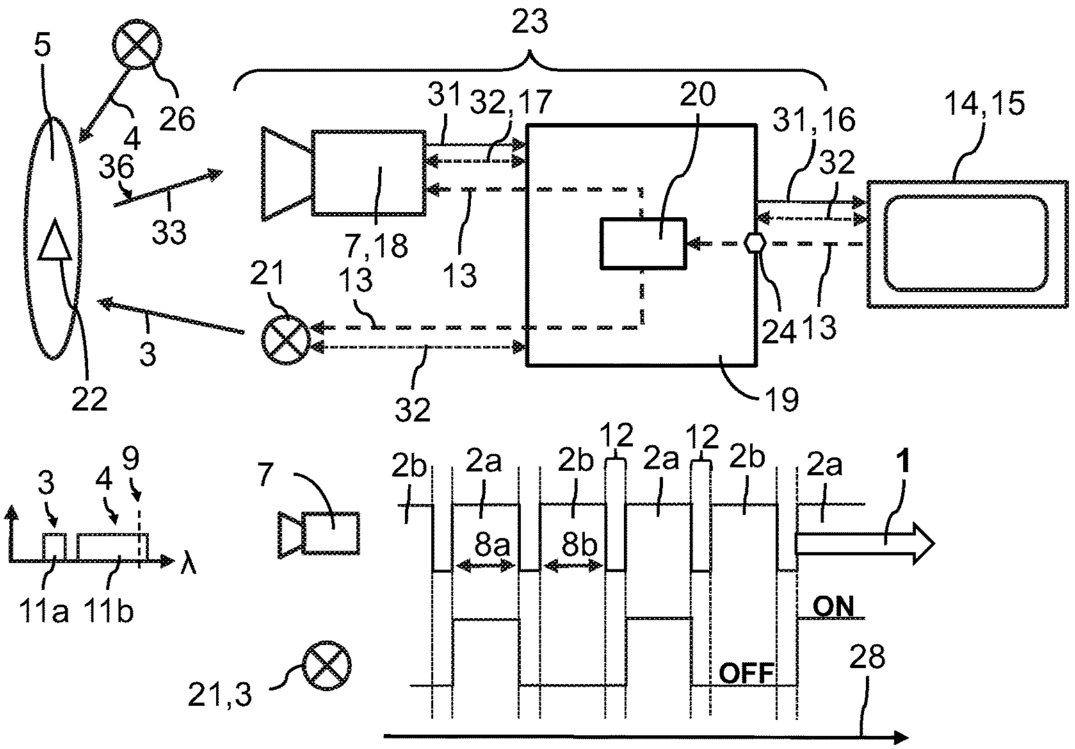
Figure 2:
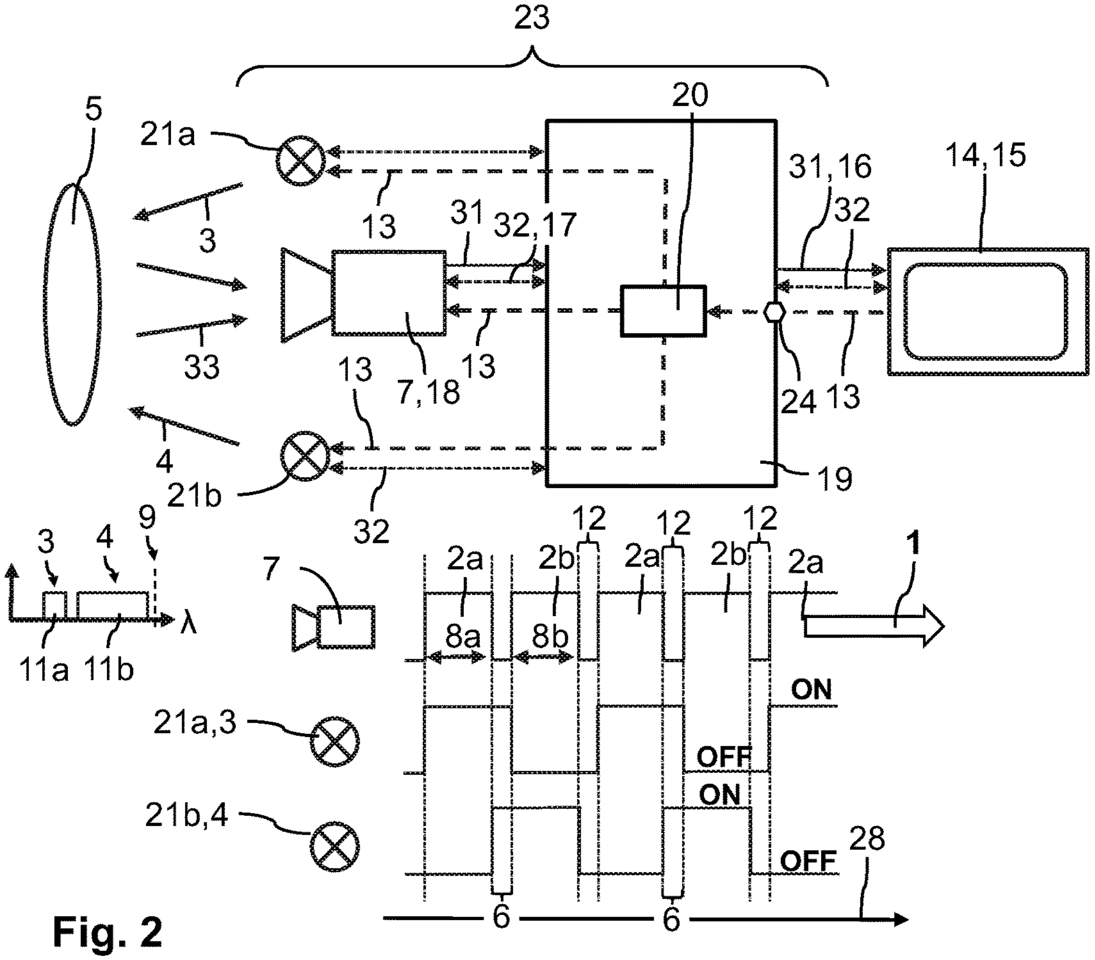
Figure 3:
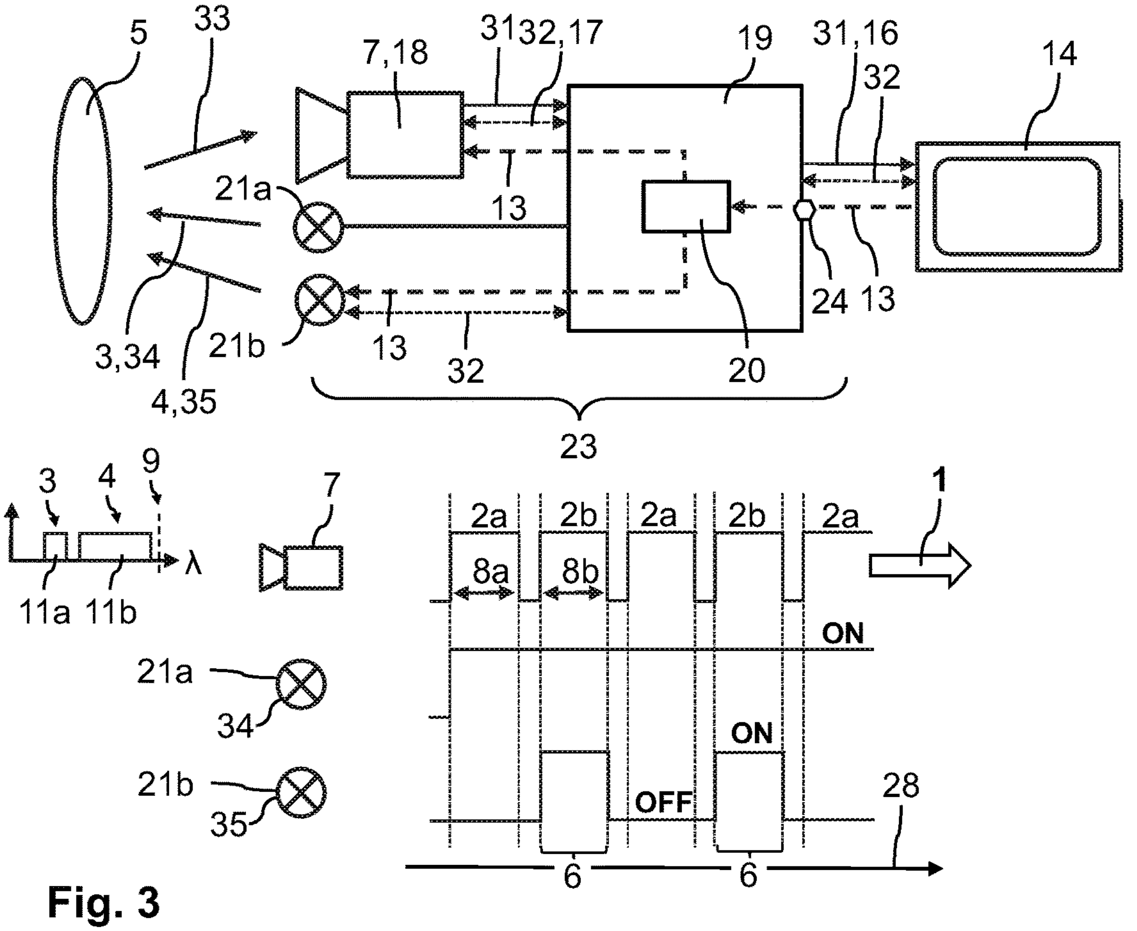
Figure 4:
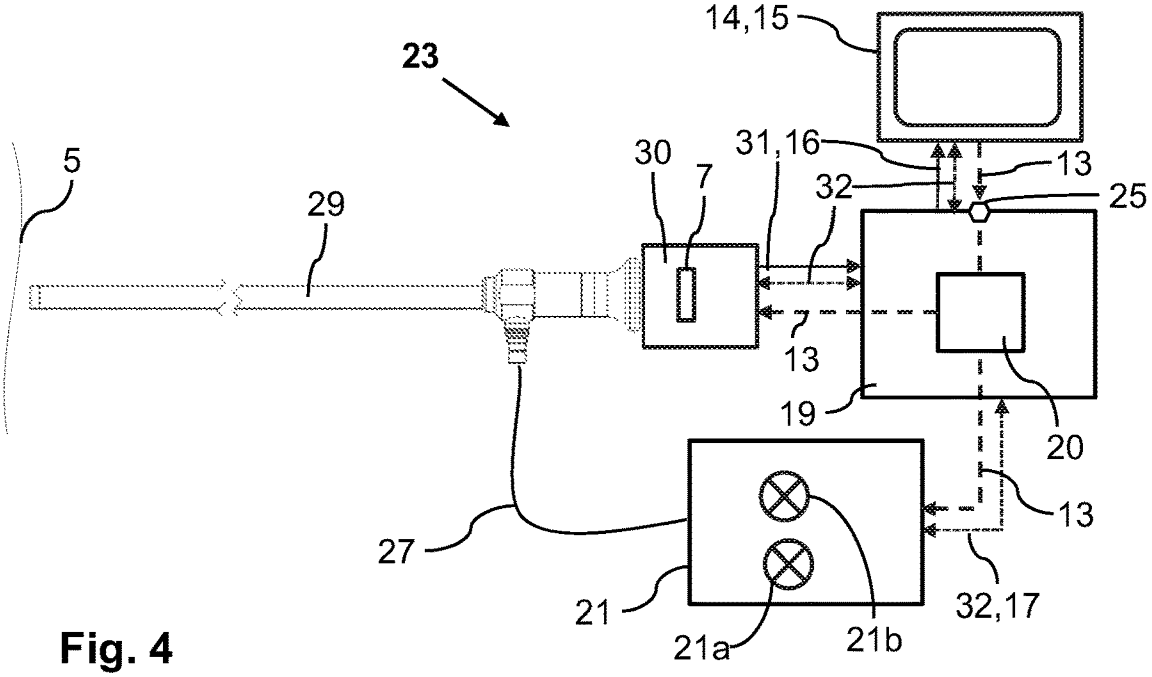
Figure 5:
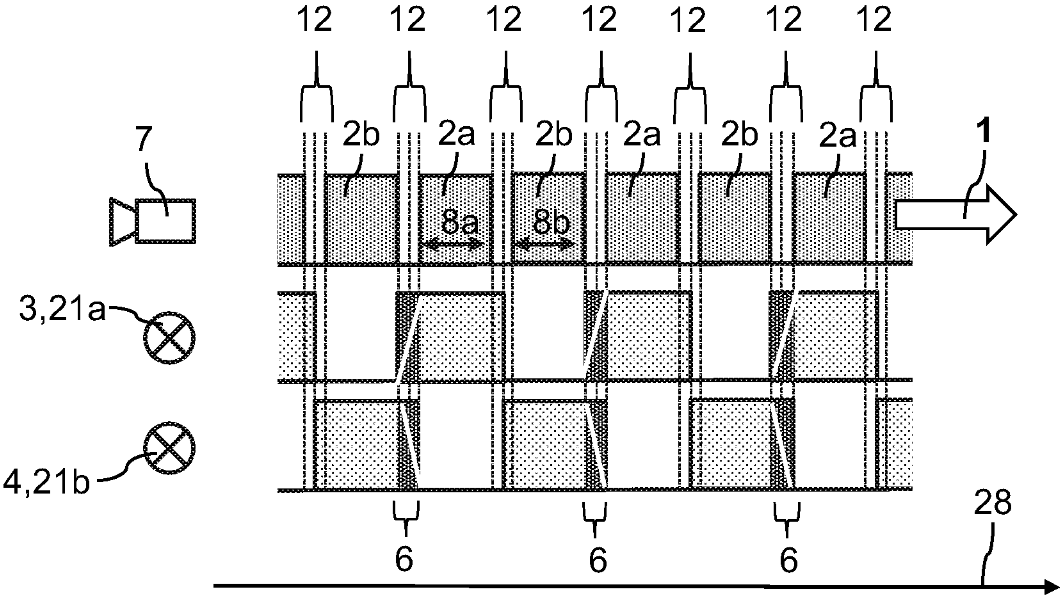
Figure 6:
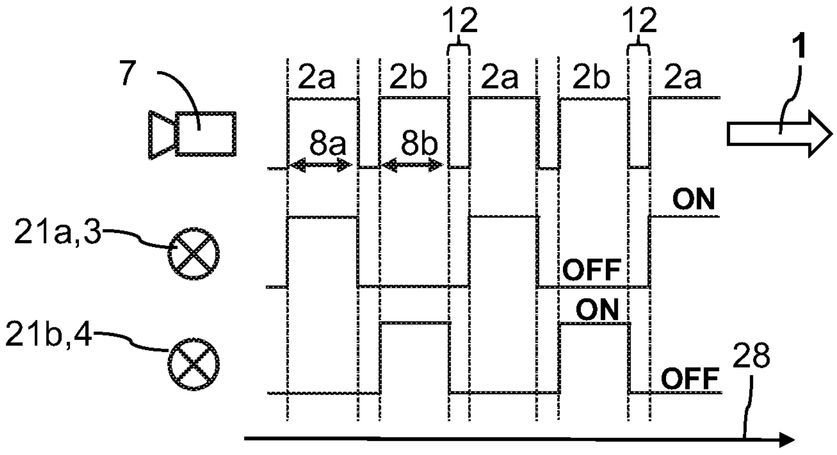
Figure 7:
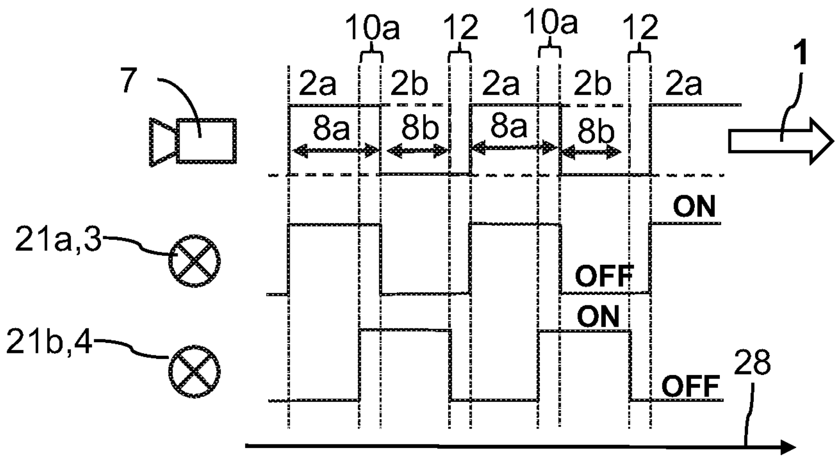

FIG. 1 shows a schematic representation of an image recording system according to the invention having a light source which is modulated, and a time diagram which illustrates the recording of single images using the image recording system under alternating illumination, FIG. 2 shows a schematic representation of a further image recording system according to the invention having two light sources, which are each modulated, wherein an associated time diagram also illustrates the change of the illumination here FIG. 3 shows a schematic representation of a third image recording system according to the invention having two light sources, one of which is modulated, wherein an associated time diagram also illustrates the change of the illumination here FIG. 4 shows a possible implementation of an image recording system according to the invention in the form of an endoscope having a camera head FIG. 5 shows a time diagram of an image stream which was recorded using alternating illumination with the aid of a method according to the invention FIG. 6 shows a time diagram of an image stream including associated alternating illumination, wherein this image stream was also recorded using a method according to the invention, an FIG. 7 shows a further time diagram of an image stream including associated alternating illumination, wherein this image stream was also recorded using a method according to the invention.

DETAILED DESCRIPTION

FIG. 1 shows a first example of an image recording system 23 designed according to the invention. The image recording system 23 comprises a single image sensor 7, which is configured to record two different types of single images 2*a* and 2*b* in two different wavelength ranges 11*a* and 11*b*, specifically in the form of a continuous image stream 1, as illustrated in the time diagram of FIG. 1. The image stream 1 thus consists of a sequence of single images 2*a*, 2*b*, 2*a*, 2*b*, etc., which each spectrally differ in the sense that the image information of the respective single image was recorded with the aid of spectrally different light spectra.

The continuous image stream 1 recorded using the single image sensor 7 is transmitted via corresponding image signal lines 31 to a playback device 14 in the form of a monitor 15, so that the image stream 1 can be played back by the playback device 14. A user can thus observe the scene 5, which is observed/recorded using the image recording system 23, more precisely its video camera 18, as a live video image data stream on the monitor 15.

It is now characteristic for the invention that the playback device 14 outputs a synchronization signal 13, which is transferred via the signal input port 24 of the image recording system 23 shown to the latter. That is to say, the image recording system 23 is configured to receive the external synchronization signal 13 by means of the signal input port 24 (any interface 25, which is in particular wireless, suitable for this purpose would be technically equivalent thereto). A controller 20 of the image recording system 23 then processes the synchronization signal 13 and thus activates the image sensor 7 of the image recording system 23. This is because the image sensor is designed so that a rate of the image sensor 7 when recording the single images 2 is specifiable. In addition, the image sensor 7 is configured so that this rate can be adapted on the basis of the synchronization signal 13 supplied by the controller 20. Such an adaptation can relate to a frequency of the image recording by means of the image sensor 7 and/or a respective point in time of the beginning of the respective chronological recording segment 8.

In exemplary embodiments of the invention, a rate of the controller 20 is therefore also conceivable in which only the synchronization of the controller 20 with the playback device 14 is ensured by the specification of a rate by the playback device 14 and therefore recording of the sequence of the single images 2 synchronous to the synchronization signal 13 of the playback device 14, but without the image recording frequency (number of recorded images/second) of the image sensor 7 being adopted in this case. However, even if the image recording frequency is not adopted, the point in time of the beginning of the respective recording segment can be synchronized with the aid of the (external) synchronization signal 13 with the alternating illumination used in the method according to the invention. An electronic intermediate buffer for the single images 2 can be omitted here in the great majority of cases.

As a result (in both of the above-described cases), the recording of the sequence of single images 2 using the image sensor 7 is thus triggered with the aid of the external synchronization signal 13, thus the point in time of the beginning of the respective chronological recording segment 8, which is provided for recording one of the single images 2, is specified. The recording of the single images is thus chronologically synchronized with the playback of the image stream 1 from the playback device 14, by which in particular longer latency times are avoided.

FIG. 1 also shows an external light source 26, which supplies a background illumination of the scene 5 by means of a second illumination light 4. In this case, this light source 26 is neither activated by the image recording system 23 nor supplied with electrical power. The image recording system 23, which can be designed, for example, as an endoscope, as an exoscope, or, for example, also as a microscope, has its own integrated light source 21, however, by means of which a first illumination light 3 can be emitted onto the scene 5. For this purpose, the light source 21 is activated via a corresponding control signal line 32 by the central controller 20 of the image recording system 23, which is in turn located in a camera control unit 19 of the image recording system 23. As shown in the spectral diagram on the very left in FIG. 1, the first illumination light 3 is in a first wavelength range 11*a*, which differs from a second wavelength range 11*b*, in which the broadband second illumination light 4 of the external light source 26 lies.

To now be able to record spectrally different single images 2*a* and 2*b* using the same image sensor 7, during the recording of the single images 2, the scene 5 is illuminated using a chronologically alternating illumination. This has the result that different light spectra are each used for the imaging using the image sensor 7 at different points in time during the recording of the image stream 1.

To avoid latency times here, the synchronization signal 13 is transmitted in real-time and without using an electronic intermediate buffer from the playback device 14 to the image sensor 7, but also to the light source 21 shown. In this case, the chronological modulation of the alternating illumination, namely the chronological modulation of the first illumination light 3 emitted by the light source 21, is triggered with the aid of the synchronization signal 13.

The image stream 1 is thus played back at a playback frequency on the playback device 14, which is chronologically synchronized with a modulation frequency of the alternating illumination. Furthermore, it is thus ensured that the change of the alternating illumination runs synchronized with an image recording frequency of the image sensor 7, since this is also triggered with the aid of the synchronization signal 13. As FIG. 1 shows, the synchronization signal 13 is initially received here by the camera control unit 19 and this, more precisely the controller 20, then transmits the synchronization signal 13 to the light source 21 in order to thus trigger the chronological modulation of the illumination 3 used.

As the lower time diagram in FIG. 1 shows, the sequence comprises multiple type A single images 2*a* and multiple type B single images 2*b*, wherein these two different types of single images 2*a* and 2*b* each alternate. The single image 2*a* is recorded here during the chronological recording segment 8*a*, while the respective single image 2*b* is recorded during a chronological recording segment 8*b*. As can furthermore be seen, the light source 21 is only switched on in each of the recording segments 8*a*, while it remains switched off in the recording segments 8*b*. The background illumination 4, which is generated using the external light source 26, in contrast, is not chronologically modulated. Therefore, both the first illumination light 3 and the second illumination light 4 are incident on the scene 5 in the recording segments 8*a*.

In the example of FIG. 1, the first illumination light 3 could be, for example, an excitation light 34 which results in the emission of a fluorescence wavelength 9. If an excitation light filter were used in the image recording system 23, for example, in this case the image sensor 7 could sensorially acquire as image data during the image recording segments 8*a* both the broadband background illumination 4, which is reflected from the scene 5, and said fluorescence wavelength 9, which is emitted at specific points by a fluorophore. In this case, the single images 2*a* would thus be mixed images, which comprise both the spectrum of the second illumination 4 and an additional emission wavelength 9, wherein the fluorescence wavelength 9 was not detected in the single images 2*b*, since the first illumination light 3 is just not emitted in the recording segments 8*b*, so that no fluorescence is also excited in these time segments (wherein delay effects in the light emission are neglected here).

FIG. 2 shows a further possible design of a method according to the invention or an image recording system 23 according to the invention. In contrast to the preceding example of FIG. 1, the image recording system 23 now also has, in addition to a first light source 21*a*, a second light source 21*b*. The light source 21*a* emits a first illumination light 3, while the second light source 21*b* emits a second illumination light 4. The two illumination lights 3 and 4 used again differ in their spectral properties, as is shown on the basis of the spectral diagram on the very left in FIG. 2. Both light sources 21*a* and 21*b* are each chronologically triggered with the aid of the synchronization signal 13, which is output or specified by the playback device 14. In other words, the respective light intensity which is emitted by the respective light source 21*a*/21*b*, is modulated by the controller 20 on the basis of the received external synchronization signal 13, wherein the modulation is electronically implemented. The camera control unit 19 is thus again configured here to receive the external synchronization signal 13 and to transmit it not only to the image sensor 7, in order to trigger the recording of the single images 2*a* and 2*b*, but also to the two light sources 21*a* and 21*b*, in order to thus trigger the respective chronological modulation of the light source 21*a*/21*b*.

As a result, during the entire chronological recording of the type A single image 2*a*, the scene 5 is only irradiated using the first illumination light 3, but not using the second illumination light 4. Furthermore, in the example of FIG. 2, during the entire chronological recording of the respective type B single image 2*b* (thus during the respective recording segment 8*b*), the scene 5 is only irradiated using the second illumination light 4, but not using the first illumination light 3.

However, it can also be seen in the time diagram of FIG. 2 that a chronological overlap segment 6 is formed in each case between the respective recording segment 8*a*/8*b*, in which the scene 5 is simultaneously irradiated using the first illumination light 3 and the second illumination light 4. The time diagram is to be understood schematically here; the respective rising and falling flanks of the intensity of the first or the second illumination light 3/4 can result as less steep in reality, depending on how quickly the respective light source 21 can be modulated. Furthermore, it can be seen in the time diagram of FIG. 2 that the respective overlap segment 6 lies in a waiting interval 12 between two directly successive single images 2*a*, 2*b* of the sequence, wherein in particular no single image 2 is recorded using the image sensor 7 in this waiting interval 12.

However, the method according to the invention could also be designed as in FIG. 6, for example, where the two light sources 21*a* and 21*b* of the image recording system 23 are likewise each chronologically modulated with the aid of the external synchronization signal 13 and moreover waiting interval 12, in which no image recording takes place, are also used, but there are no chronological overlap segments 6 there with respect to the illumination used, since at each point in time only either the first illumination light 3 or the second illumination light 4 is always incident on the scene 5. Such a procedure can be useful, for example, if both illumination lights 3, 4 are excitation lights 34 which are used to excite a respective fluorophore. In such a case, the respective single images 2*a* and 2*b* of the sequence can thus each be fluorescence images, but with respect to a respectively different fluorescence wavelength, which is excited to emission by irradiating the scene 5 using the respective excitation light 34. In this case, spectrally pure fluorescence images 2*a* and 2*b* are thus each recorded using the same image sensor 7.

It is also clearly apparent in FIG. 6 that an illumination-free pause segment 36, which is achieved by correspondingly switching off the two light sources 21*a* and 21*b*, is configured between two directly successive chronological illumination segments, respectively of the first illumination light 3 or the second illumination light 4. In this case, the pause segment 36 could also overlap with one of the two recording segments 8*a* or 8*b*, if they were chronologically extended, thus the waiting interval 12 were shortened. This can make sense, for example, with fluorescence applications, because the light emission often does not last there if the associated excitation light 34 is already switched off.

FIG. 3 shows a third example of an image recording system 23 according to the invention, which is very similar to that of FIG. 2. However, the first light source 21*a*, which emits the first illumination light 3, is supplied with an operating voltage here, but is not chronologically modulated. The first illumination light 3 is now designed as an excitation light 34, which permanently illuminates the scene 5, so that an emission of a fluorescence wavelength 9 occurs continuously. In other words, in the method variant shown in FIG. 3, the scene 5 is continuously illuminated using the excitation light 34 and alternately using a white light 35, which is emitted by the chronologically and electronically modulated second light source 21*b*. The modulation of the white light 35 takes place here on the basis of the external synchronization signal 13, which is output by the playback device 14. As a result, fluorescence images 2*a* can be recorded as well as mixed images 2*b*, since in the image recording segments 8*b*, both the first illumination light 3 and the second illumination light 4 is incident on the scene 5. I.e., the white light images 2*b* reflect both the broadband spectrum of the second illumination light 4 and the emission wavelength 9, which is recognizably outside the spectrum of the second illumination light 4 here. It is already known from the prior art that in this case the fluorescence image component, in consideration of the image information from the single images 2*a*, can be calculated out of the mixed images 2*b*, so that synthetic white light images can be obtained in which the fluorescence wavelength 9 or the associated fluorescence image single is no longer contained.

It is also readily apparent in the example of FIG. 3 that therein the overlap segment 6, in which both the first illumination light 3 and the second illumination light 4 are incident on the scene 5, actually just corresponds to the chronological recording segment 8*b*, in which the second type B single image 2*b* is recorded.

The example of FIG. 4 shows how an image recording system 23 according to the invention can be practically implemented. An endoscope 29 having an associated camera head 30, which carries a single CMOS image sensor 4, can be seen. This sensor is activated via a corresponding control signal line 32 by a controller 20, which is seated in a camera control unit 19 of the image recording system 23. The image signals 16 are transmitted via an image signal line 31 from the image sensor 7 to the camera control unit 19 and from there to the playback device 14. The controller 20 again receives the synchronization signal 13 emitted by the playback device 14 via a wireless interface 25. The single light source 21 is designed as an external light source unit separate from the endoscope 29 (this can also have multiple spectrally different lighting means/light sources 21*a*, 21*b*) and is also chronologically modulated with the aid of the synchronization signal 13 (more precisely its intensity). In this case, the light emitted by the light source 21 is transmitted by means of a light guide 27 to the endoscope, wherein the illumination light is emitted at the tip of the endoscope onto the scene 5.

FIG. 5 shows a further possibility for how a method according to the invention can be designed. In the time diagram shown, it can be seen that overlap segments 6 are again formed with respect to the two illumination lights 3 and 4 used, as well as recording-free waiting intervals 12 between two directly successive single images 2*a* and 2*b*. The white lines are to illustrate here that in the respective overlap segment 6, for example, the intensity of the second illumination light 4 can drop while the intensity of the first illumination light 3 is presently rising. In other words, a change of the illumination is completed in the waiting interval 12. However, during the respective recording segment 8*a* or 8*b*, the scene 5 is always illuminated with only one of the two illumination lights 3 or 4, so that the single images 2 obtained are each spectrally pure (no mixed images).

In contrast, it can be seen in the example of FIG. 7 (in comparison to the diagram of FIG. 6) that both the respective image recording segment 8*a* for the first single image 2*a* and the time periods for the respective illumination by means of the light sources 21*a* and 21*b* were extended, in such a way that now during a partial segment 10*a* of the chronological type A recording segment 8*a*, the scene 5 is irradiated not only using a first illumination light 3, but also using a second illumination light 4. The single image 2*b*, in contrast, is still recorded in a recording segment 8*b*, in which the scene 5 is exclusively irradiated using the second illumination light 4.

In summary, to achieve novel technical possibilities for high-performance "advanced imaging" applications, it is proposed that an external synchronization signal 13, which is output by a playback device 14 or another data sink, such as a server application, be used to synchronize the chronological recording of an image stream 1 chronologically exactly with the playback of this image stream 1 on the playback device 14 and/or to synchronize the recording with an alternating illumination. For this purpose, the synchronization signal 13 is used to trigger an image recording frequency of an image sensor 7 of an image recording system 23 according to the invention, by means of which the image stream 1 is recorded. Furthermore, the synchronization signal 13, additionally or alternatively to the triggering of the image sensor 7, can also be used to chronologically trigger a light source 21 of the image recording system 23, so that during the recording of the sequence of single images 2, an alternating illumination can be obtained which is also synchronized with the recording of the single images 2 and/or with the image playback on the playback device 14 and/or the image recording frequency of the image sensor 7 (cf. FIG. 1).

LIST OF REFERENCE SIGNS

1 image stream
2 single image
3 first illumination light
4 second illumination light
5 scene
6 overlap segment
7 image sensor
8 recording segment
9 fluorescence wavelength
10 partial segment (of 8)
11 wavelength range
12 waiting interval
13 (external) synchronization signal (abbreviated: SYNC signal)
14 playback device (can be designed as a monitor/display, or as VR glasses or projector, etc.)

15 monitor
16 image signal
17 control signal
18 video camera
19 camera control unit (CCU)
20 controller
21 light source (as part of 23)
22 object (is observed using 7/18)
23 image recording system
24 signal input port (to receive 13)
25 interface (wireless or wired; configured to receive 13)
26 external light source (is not activated by means of 13)
27 light guide
28 time axis
29 endoscope
30 camera head
31 image signal line
32 control signal line
33 light spectrum used for imaging
34 excitation light (for exciting fluorescence)
35 white light
36 illumination-free pause segment

The invention claimed is:

1. A method for multispectral recording of an image stream (1), the method comprising:

recording a sequence of single images (2) of a scene (5) as an image stream (1) using an image sensor (7) of an image recording system (23), including recording at least two different types of the single images (2*a*, 2*b*) in different associated wavelength ranges (11*a*, 11*b*) using the image sensor (7);

wherein the recording of the sequence of the single images (2) using the image sensor (7) is triggered using an external synchronization signal (13);

wherein the image recording system (23) features a signal input port (24) or an interface (25) via which the external synchronization signal (13) can be received by the image recording system (23); and wherein the external synchronization signal (13) is provided by:

an external playback device, which is used for playing back the image stream (1), or by another external data sink, to which the image recording system (23) transmits the image stream (1), wherein the external playback device or said another external data sink functions as a clock source for recording the sequence of the single images (2).

2. The method as claimed in claim 1, wherein the image stream (1) is played back by a playback device (14), which outputs the synchronization signal (13).

3. The method as claimed in claim 1, further comprising during the recording of the single images (2*a*, 2*b*), illuminating the scene (5) using a chronologically alternating illumination, so that the at least two different types of single images (2*a*, 2*b*) spectrally differ.

4. The method as claimed in claim 1, further comprising transmitting the synchronization signal (13) in real-time.

5. The method as claimed in claim 1, further comprising the recording including recording at least one type A of the single images (2*a*) of the sequence during a chronological type A recording segment (8*a*), and recording at least one type B of the single images (2*b*) of the sequence during a chronological type B recording segment (8*b*), wherein the at least one type A single image (2*a*) and the at least one type B single image (2*b*) are recorded using the same image sensor (7).

6. The method as claimed in claim 5, wherein the recording of the at least one type A single image (2*a*) is recorded while illuminating the scene (5) using or by a first illumination light (3), which is in a first wavelength range (11*a*), and the recording at least one type B single image (2*b*) is recorded while the scene (5) is illuminated using a second illumination light (4), which is in a second wavelength range (11*b*) deviating from the first wavelength range (11*a*).

7. The method as claimed in claim 6, further comprising triggering a chronological modulation of the alternating illumination of at least one of the first illumination light (3) or the second illumination light (4) using the synchronization signal (13) output by the playback device (14).

8. The method as claimed in claim 7, further comprising a camera control unit (19) receiving the synchronization signal (13) from the playback device (14) and transmitting the synchronization signal to a light source (21) in order to thus trigger the chronological modulation of the at least one of the first illumination light (3) or the second illumination light (4).

9. The method as claimed in claim 8, further comprising continuously illuminating the scene (5) using a) an excitation light (34) and alternately using white light (35), or b) white light (35) and alternately using an excitation light (34) and controlling the modulation of the white light (35) or the excitation light (34) using the external synchronization signal (13).

10. The method as claimed in claim 9, wherein in at least one chronological overlap segment (6), the scene (5) is simultaneously irradiated using at least one of the first illumination light (3) and the second illumination light (4) or the excitation light (34) and the white light (35), and the overlap segment (6) lies in a waiting interval (12) between two directly successive ones of the single images (2*a*, 2*b*) of the sequence, in which no said single image (2) is recorded.

11. The method as claimed in claim 10, wherein the chronological overlap segment (6) corresponds to a chronological recording segment (8), within which one of the single images (2) is recorded.

12. The method as claimed in claim 6, wherein at least one of a) during at least one partial segment (10*a*) of the chronological type A recording segment (a), the scene (5) is also irradiated using the second illumination light (4), or b) during at least one partial segment (10*b*) of the chronological type B recording segment (8*b*), the scene (5) is also irradiated using the first illumination light (3).

13. The method as claimed in claim 6, wherein at least one of a) during an entire chronological recording of the respective type A single image (2*a*), the scene (5) is only irradiated using the first illumination light (3) and not using the second illumination light (4), or b) during an entire chronological recording of the respective type B single image (2*b*), the scene (5) is only irradiated using the second illumination light (4), and not using the first illumination light (3).

14. The method as claimed in claim 6, wherein at least one of a) an intensity of the first illumination light (3) before the overlap segment (6) is greater than in and/or after the overlap segment (6), or b) an intensity of the second illumination light (4) after the overlap segment (6) is greater than in and/or before the overlap segment (6).

15. The method as claimed in claim 6, wherein the image stream (1) is played back on or by the playback device (14) with a playback frequency which is chronologically synchronized with at least one of a) a modulation frequency of the alternating illumination, or with an image recording frequency, at which the image sensor (4) records the single images (2).

16. The method as claimed in claim 6, further comprising between two directly successive chronological illumination segments of at least one of the first illumination light (3) or the second illumination light (4), configuring an illumination-free pause segment (36), which is achieved by accordingly switching off at least one light source (21).

17. The method as claimed in claim 16, wherein the pause segment (36) overlaps with at least one said recording segment (8) of one of the single images (2).

18. An image recording system (23), comprising:

an image sensor (7), which is configured to record at least two different types of single images (2*a*, 2*b*) in different associated wavelength ranges (11*a*, 11*b*) as a continuous image stream (1), with a rate of the image sensor (7) during the recording of the single images (2*a*, 2*b*) being specifiable;

the image sensor (7) is configured to adapt the rate based on an external synchronization signal (13) provided by an external playback device, which is used for playing back the image stream (1), or by another external data sink, to which the image recording system (23) transmits the image stream (1), wherein the external playback device or said another external data sink functions as a clock source for recording the single images (2*a*, 2*b*), by changing at least one of an image recording frequency or by changing a respective starting point of the recording segment (8*a*, 8*b*) associated with said single image (2*a*, 2*b*); and the image recording system (23) is configured to receive the external synchronization signal (13) via a signal input port (24) or an interface (25).

19. The image recording system (23) as claimed in claim 18, wherein the image recording system (15) comprises at least one light source (21), which emits at least one of a first illumination light (3) or a second illumination light (4); and the image recording system (23) further comprises a controller (20) that is configured to activate the at least one light source (21) based on the received external synchronization signal (13) in order to modulate an intensity.

20. The image recording system (23) as claimed in claim 19, further comprising a camera control unit (19), which is configured to receive the external synchronization signal (13) and to at least one of a) transmit the external synchronization signal (13) to the image sensor (7), in order to thus trigger the recording of the single images (2*a*, 2*b*), or b) transmit the external synchronization signal (13) to the light source (21) in order to thus trigger a chronological modulation of the light source (21).

* * * * *